United States Patent [19]
Sugawara

[11] Patent Number: 5,903,694
[45] Date of Patent: May 11, 1999

[54] FIBER OPTICS DEVICE

[75] Inventor: Takeo Sugawara, Hamamatsu, Japan

[73] Assignee: Hamamatsu Photonics K.K., Hamamatsu, Japan

[21] Appl. No.: 08/838,047

[22] Filed: Apr. 22, 1997

[30] Foreign Application Priority Data

Apr. 22, 1996 [JP] Japan .................................... 8-100158

[51] Int. Cl.⁶ ...................................................... G02B 6/08
[52] U.S. Cl. ............................................ 385/121; 385/116
[58] Field of Search ................................... 385/121, 120, 385/116, 117, 115, 119

[56] References Cited

U.S. PATENT DOCUMENTS

| 3,874,783 | 4/1975 | Cole | 385/115 |
| 3,906,520 | 9/1975 | Phillips | 385/120 |
| 4,099,833 | 7/1978 | Tosswill | 385/43 |
| 4,139,261 | 2/1979 | Hilsum | 385/120 |
| 4,932,776 | 6/1990 | Dowling, Jr. et al. | 356/71 |
| 5,426,296 | 6/1995 | Shikai et al. | 250/227.2 |
| 5,465,315 | 11/1995 | Sakai et al. | 385/116 |
| 5,502,457 | 3/1996 | Sakai et al. | 385/116 |
| 5,684,906 | 11/1997 | Sugawara | 385/120 |

FOREIGN PATENT DOCUMENTS

| 747 737 | 6/1995 | European Pat. Off. . |
| 2634370 | 2/1977 | Germany . |
| 7-174947 | 7/1995 | Japan . |
| 1 483 878 | 8/1977 | United Kingdom . |

OTHER PUBLICATIONS

Tsuchiya, H. et al., "Double Eccentric Connectors for Optical Fibers", Applied Optics, May 1977, vol. 16, No.5, pp. 1323–1331.

Primary Examiner—Rodney Bovernick
Assistant Examiner—Ellen E. Kang
Attorney, Agent, or Firm—Pillsbury Madison & Sutro LLP

[57] ABSTRACT

A fiber optics device of this invention includes first and second optical members. The first optical member is obtained by integrating a plurality of optical fibers of the first type by bundling, and has first and second end faces formed obliquely to the optical axis of the optical fibers of the first type and parallel to each other. The second optical member is obtained by integrating a plurality of optical fibers of the second type by bundling, and has first and second end faces formed obliquely to the optical axis of the optical fibers of the second type and parallel to each other. The optical fibers of the second type have a larger numerical aperture than that of the optical fibers of the first type. The first end face of the second optical member is bonded to the second end face of the first optical member.

5 Claims, 7 Drawing Sheets

FIBER OPTICS DEVICE

BACKGROUND OF THE INVENTION

1. Field of the Invention

The present invention relates to a fiber optics device used for fingerprint detection and the like.

2. Related Background Art

In a fingerprint detecting apparatus and the like, a fiber optics device is used as a means for converting the three-dimensional surface shape of a detection target into an optical image. As an example which practically uses such a fiber optics device as a fingerprint detecting apparatus, one described in Japanese Patent Laid-Open No. 7-174947 is known. In the fiber optics device of this reference, the direction of an optical axis of optical fibers constituting the fiber optics device is inclined by an inclination angle $\theta$ with respect to the incident angle and exit angle, as shown in FIG. 11 of the reference. A CCD is mounted on this exit surface. In this fiber optics device, the incident surface and the exit surface are formed to be inclined with respect to the direction of the optical axis, in order to prevent light from becoming incident on the fiber optics device directly from the external air. Also, the distance between a surface with which a finger as a detection target comes in contact (the incident surface of the fiber optics device) and the CCD is decreased, in order to decrease the size of the fingerprint detecting apparatus.

In the fiber optics device described above, since the light exit surface is also inclined with respect to the direction of the optical axis of the optical fibers, even if a fingerprint image is incident on the fiber optics device through the finger which has come in contact with the light-incident angle, light does not efficiently emerge to the external air from the image exit surface. Even if a CCD is mounted on the exit surface to change the exit characteristics, the quantity of light emerging from the exit surface is very small, and the image of a fingerprint to be detected tends to be dark accordingly.

SUMMARY OF THE INVENTION

It is an object of the present invention to provide a fiber optics device having excellent light exit characteristics.

According to the present invention, there is provided a fiber optics device comprising: a first optical member obtained by integrating a plurality of optical fibers of a first type by bundling and having first and second end faces, the first end face obliquely intersecting an image transmitting direction at a first angle, the second end face being substantially parallel to the first end face thereof, and the optical fibers of the first type having a first numerical aperture and cores with a first refractive index; and a second optical member obtained by integrating a plurality of optical fibers of a second type by bundling and having first and second end faces, the first end face obliquely intersecting the image transmitting direction at a second angle, the second end face being substantially parallel to the first end face thereof, the optical fibers of the second type having a second numerical aperture larger than the first numerical aperture and cores with a second refractive index, and the first end face of the second optical member being bonded to the second end face of the first optical member.

According to the present invention, light incident on the first optical member propagates through the first optical member and emerges toward the second optical member. Since the optical fibers of the second type have a numerical aperture larger than that of the optical fibers of the first type, the range of exit angle of light emerging from the exit surface of the second optical member is wide.

In the fiber optics device according to the present invention, the first angle can be set smaller than the second angle.

In this case, when light becomes incident from the first end face of the first optical member and sequentially propagates through the first and second optical members to emerge from the second end face of the second optical member, the quantity of light components of this light emerging from the second end face of the second optical member and perpendicular to the second end face of the second optical member can be ensured easily.

In the fiber optics device according to the present invention, the first refractive index is preferably equal to or less than the second refractive index.

In this case, when light propagates from the first optical member to the second optical member, it is incident on the second optical member without being totally reflected by the bonding portion between the first and second optical members. Therefore, an optical loss occurring at this bonding portion is prevented.

In the fiber optics device according to the present invention, of light propagating through the first optical member and becoming incident on the first end face of the second optical member, light components having the maximum incident angle become incident on the boundary surface between the core and the cladding layer of the optical fibers of the second type at an incident angle equal to or larger than the critical angle.

According to the present invention, light which has become incident on the second optical member propagates substantially entirely along the second optical member.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Fiber optics optical member assemblies according to the various embodiments of the present invention will be described with reference to the accompanying drawings. In the drawings, the identical elements are denoted by the same reference numerals, and a repetitive explanation will be omitted.

(First Embodiment)

Figure 1:
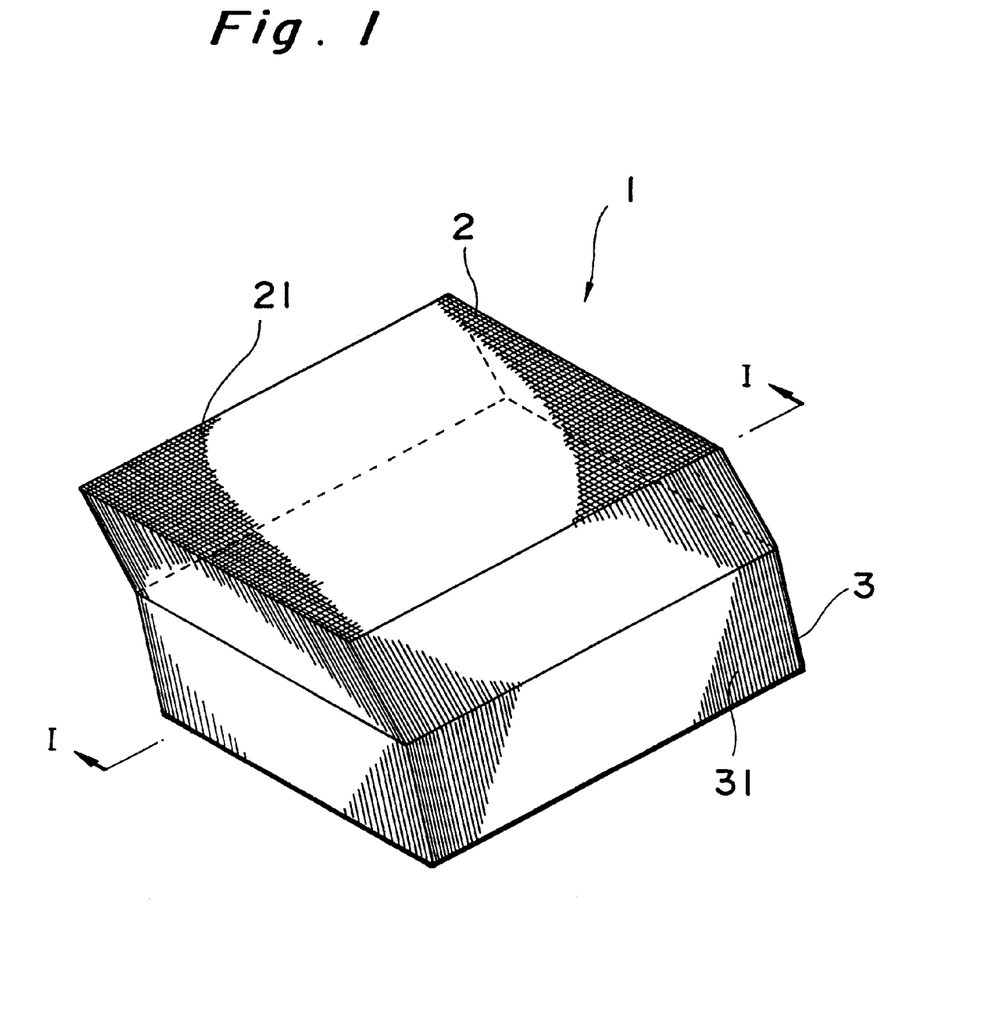
FIGS. 1, 2 and 2A are overall schematic views of a fiber optics device of the first embodiment.
Figures 2, 2A:
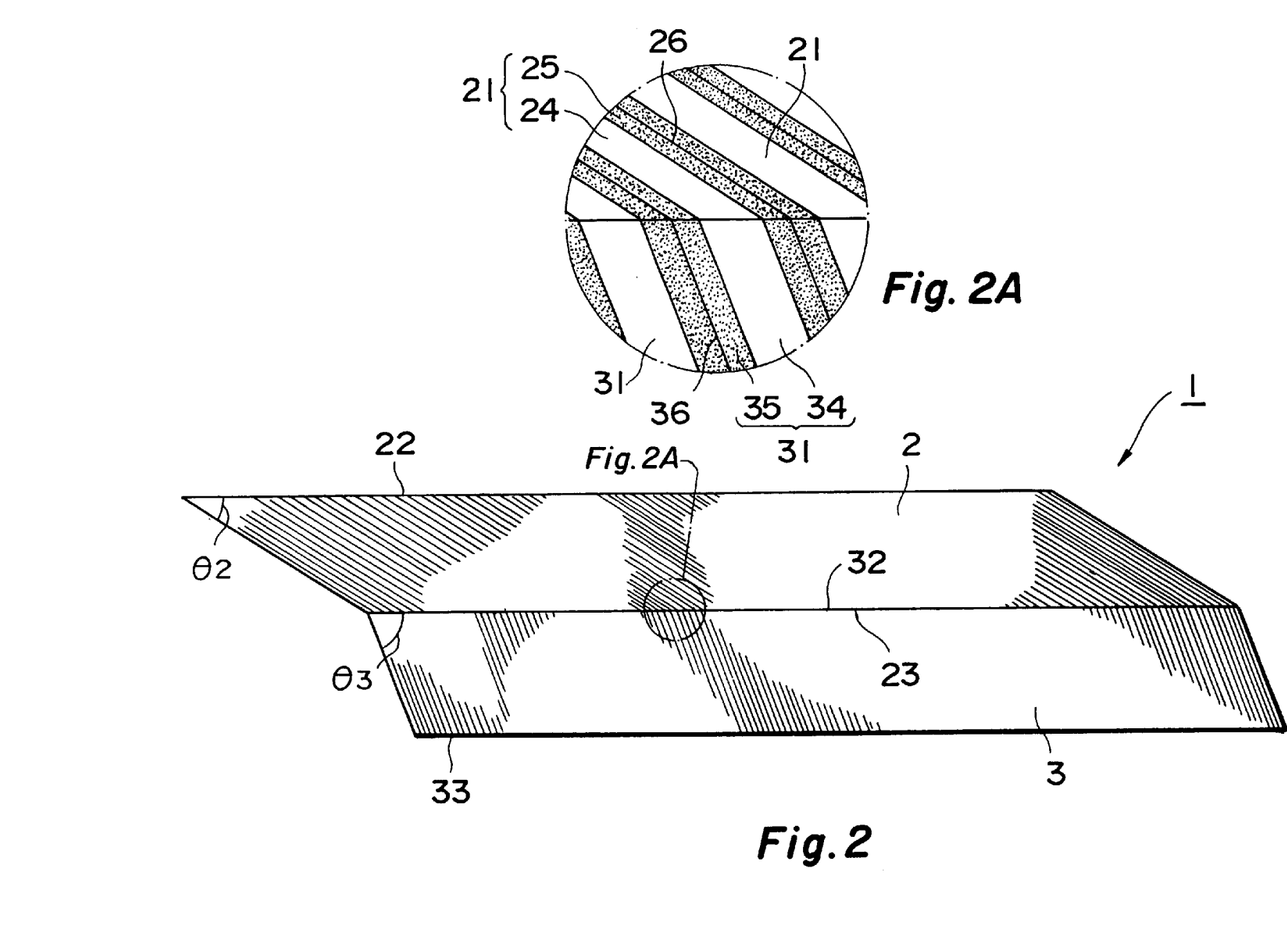

FIGS. 1, 2 and 2A are overall schematic views of a fiber optics device 1. As shown in FIGS. 1, 2 and 2A, the fiber optics device 1 is constituted by a first optical member 2 and a second optical member 3, and the first and second optical members 2 and 3 are stacked and bonded to each other. As shown in FIGS. 2 and 2A, the first optical member 2 is obtained by integrating, by bundling, a plurality of optical fibers 21 directed in the same direction, and has surfaces 22 and 23 formed obliquely to the direction of an optical axis of the optical fibers 21. More specifically, the surfaces 22 and 23 of the first optical member 2 oppose each other to be parallel to each other, and are formed at a predetermined inclination angle θ2 and not to be perpendicular or parallel to the direction of the optical axis of the optical fibers 21. In each optical fiber 21 constituting the first optical member 2, a cladding layer 25 is formed on a core 24, and the refractive index of the core 24 is set to be larger than that of the cladding layer 25. As a result, light can propagate along the core 24. Furthermore, absorbers 26 are disposed among the optical fibers 21. Hence, when light incident on an arbitrary optical fiber 21 propagates outside the cladding layer 25, it disappears as it is absorbed by the absorbers 26, so that it will not leak to the adjacent optical fibers 21.

Figure 3:
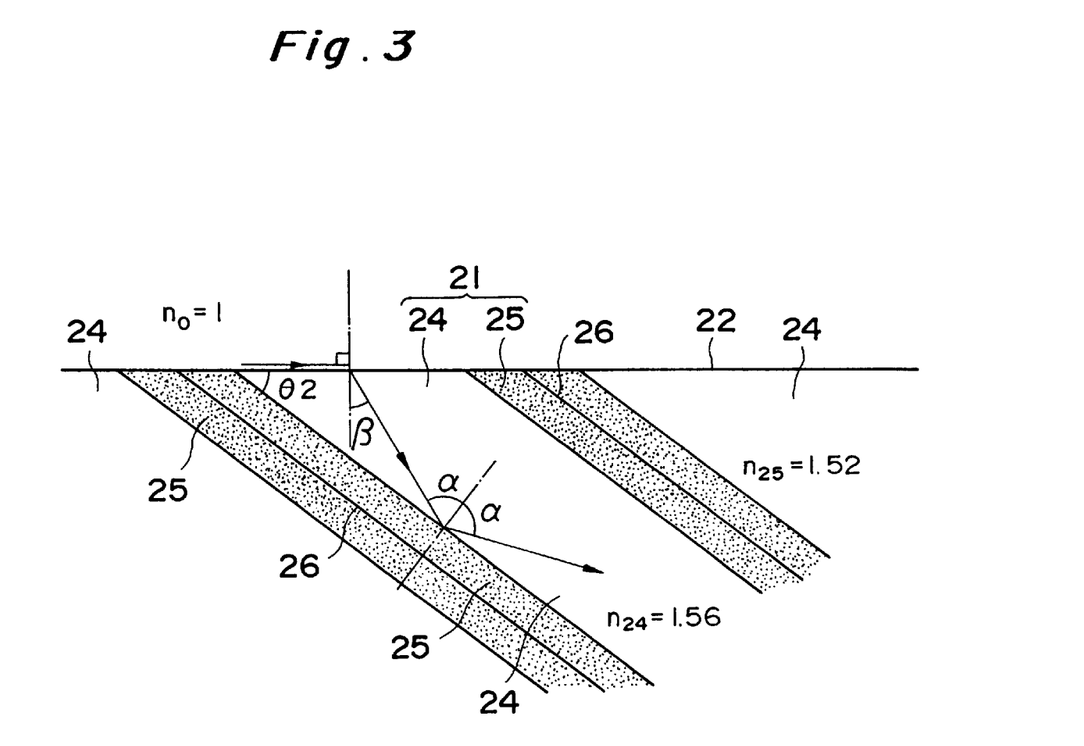
FIG. 3 is a view for explaining the inclination angle of the first optical member.

The inclination angle θ2 of the first optical member 2 described above is set to such a value that light incident on the optical fibers 21 of the first optical member 2 from the air will not propagate in the optical fibers 21. For example, the inclination angle θ2 to be set is obtained by substituting α and β satisfying the following equations (1) and (2) in equation (3):

$$n_{24} \sin \beta = n_0 \sin 90° \text{ (for the inclination angle of 90°)} \quad (1)$$

$$n_{24} \sin \alpha = n_{25} \sin 90° \text{ (for total reflection)} \quad (2)$$

$$\theta2 + (90° + \beta) + (90° - \alpha) = 180° \quad (3)$$

where β is the angle of refraction of light in the optical fibers 21 when the light becomes incident on the optical fibers 21 from a direction substantially parallel to the surface 22, α is the critical incident angle when this light becomes incident on the boundary surface between the core 24 and the cladding layer 25 as it propagates while repeating total reflection on the boundary surface, $n_0$ is the refractive index of air, $n_{24}$ is the refractive index of the core 24, and $n_{25}$ is the refractive index of the cladding layer 25, as shown in FIG. 3.

When $n_0=1$, $n_{24}=1.56$, and $n_{25}=1.52$, inclination angle θ2=37° is calculated from these equations (1), (2), and (3). Therefore, when the inclination angle θ2 is set to a value smaller than 37°, even if light becomes incident from the air to the optical fibers 21 of the first optical member 2, this light does not propagate in the optical fibers 21. In other words, if the inclination angle θ2 (<37°) is set, light incident from the air to the first optical member 2 will not emerge from the first optical member 2, but only light incident on the first optical member 2 through an object which is in contact with the surface 22 emerges.

As shown in FIGS. 1, 2 and 2A, the second optical member 3 is obtained by integrating, by bundling, a plurality of optical fibers 31 in the same direction, in the same manner as the first optical member 2. As shown in FIGS. 2 and 2A, the second optical member 3 has surfaces 32 and 33 that are formed obliquely to the direction of an optical axis of the optical fibers 31. More specifically, the surfaces 32 and 33 of the second optical member 3 are formed to oppose each other to be parallel to each other, and are formed at a predetermined inclination angle θ2 and not perpendicular or parallel to the direction of the optical axis of the optical fibers 31. In each optical fiber 31 constituting the second optical member 3, a cladding layer 35 is formed on a core 34, and the refractive index of the core 34 is set to be larger than that of the cladding layer 35. As a result, light can propagate along the core 34. Furthermore, absorbers 36 are disposed among the optical fibers 31. Hence, light becoming incident on an arbitrary optical fiber 31 does not leak to the adjacent optical fibers 31.

As shown in FIGS. 2 and 2A, the surface 32 of the second optical member 3 is bonded to the surface 23 of the first optical member 2, so that light emerging from the first optical member 2 can become incident on the surface 32. The second optical member 3 has a larger numerical aperture than that of the first optical member 2. In other words, the optical fibers 31 of the second optical member 3 have a numerical aperture larger than that of the optical fibers 21 of the first optical member 2. The numerical aperture of the second optical member 3 is determined by refractive indices $n_{34}$ and $n_{35}$ of the cores 34 and the cladding layers 35, respectively, of the optical fibers 31. More specifically, a numerical aperture NA is given by the following equation (4):

$$NA = (n_{34}^2 - n_{35}^2)^{1/2} \quad (4)$$

As the numerical aperture NA increases, the optical propagation loss in the optical fibers 31 tends to increase. Hence, the numerical aperture NA is set to an appropriate large value, e.g., about 1.0.

The refractive index $n_{34}$ of the cores 34 of the second optical member 3 is set to be larger than the refractive index $n_{24}$ of the cores 24 of the first optical member 2. For example, while the refractive index $n_{24}$ of the cores 24 of the first optical member 2 is 1.56, the refractive index $n_{34}$ of the cores 34 of the second optical member 3 is 1.82. Therefore, light propagating from the first optical member 2 to the second optical member 3 becomes incident on the second optical member 3 without being totally reflected by the bonding portion (boundary portion) between the first and second optical members 2 and 3, thereby preventing a loss in optical propagation.

Figure 4:
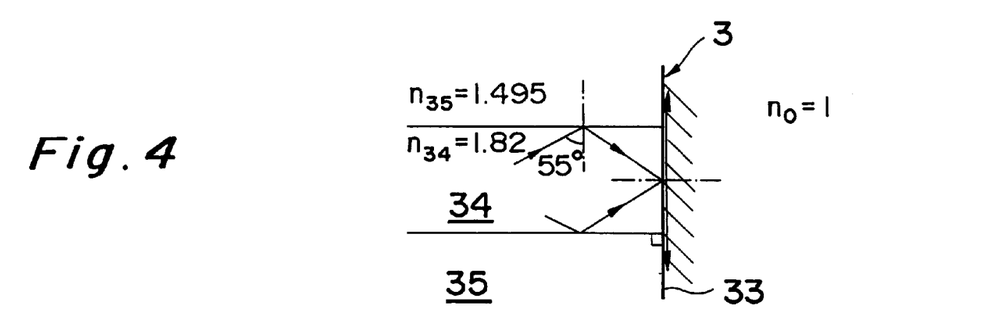
FIGS. 4 to 7 are views for explaining the exit surface of the second optical member.
Figure 5:
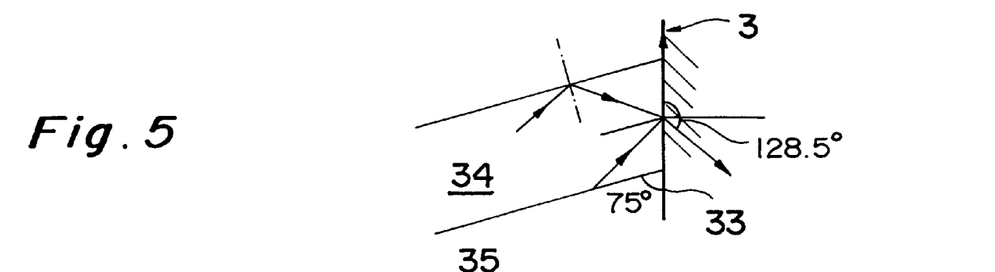
Figure 6:
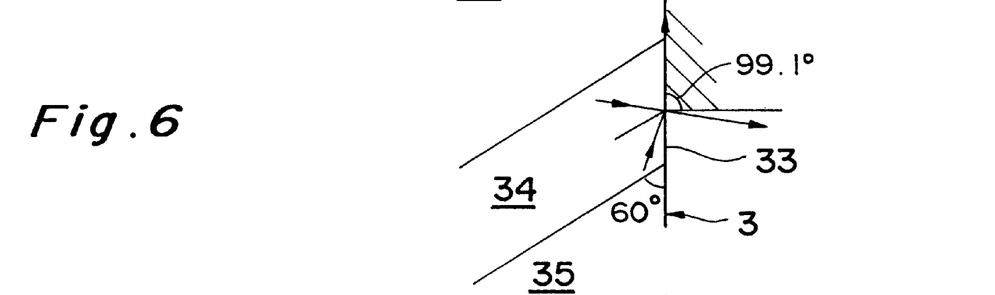
Figure 7:
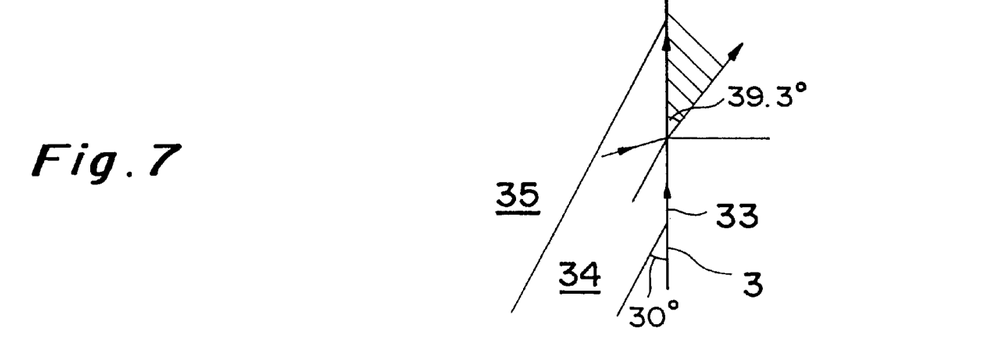

The inclination angle θ3 of the second optical member 3 described above is preferably set such that light that has propagated through the first optical member 2 and becomes incident on the second optical member 3 from the first optical member 2 at the maximum incident angle is incident on the boundary surface between the core 34 and the cladding layer 35 of the second optical member 3 at substantially the critical angle. The reason why the inclination angle θ3 is preferably set at such a value will be described. In order to allow light close to a vertical component to emerge from the surface 33 of the second optical member 3, the inclination angle θ3 formed by the direction of the optical axis of the optical fibers 31 (longitudinal direction of the cores 34) and the surface 33 must be close to a right angle. For example, assume that light propagates along the core 34 of the optical fiber 31, as shown in FIGS. 4 to 7. If the refractive index $n_{34}$ of the core 34 is 1.82 and the refractive index $n_{35}$ of the cladding layer 35 is 1.495, when the inclination angle θ3 of the surface 33 with respect to the optical axis is a right angle, as shown in FIG. 4, light emerges within a range of 180° from the surface 33. In FIG. 4, arrows in the core 34 indicate light which propagates at a critical angle (about 55°). When the inclination angle θ3 of the surface 33 with respect to the optical axis is 75°, as shown in FIG. 5, light emerges from the surface 33 within a range of 128.5°. When the inclination angle θ3 of the surface 33 with respect to the optical axis is 60°, as shown in FIG. 6, light emerges from the surface 33 within a range of 99.1°. When the inclination angle θ3 of the surface 33 with respect to the optical axis is 30°, as shown in FIG. 7, light emerges from the surface 33 within a range of 39.3°. In this manner, as the inclination angle θ3 formed by the optical axis of the optical fibers 31 and the surface 33 decreases from 90°, the angular range of light that can emerge from the surface 33 decreases. Accordingly, considering the condition with which light emerges from the surface 33, the inclination angle θ3 of the surface 33 is preferably close to a right angle.

When, however, the inclination angle θ3 of the surface 33 is close to a right angle, light becoming incident from the first optical member 2 into the optical fibers 31 of the second optical member 3 is limited. For example, FIGS. 8 to 11 respectively show the states of light which is incident on the second optical member 3 when the second optical member 3 having the inclination angle θ3 of 60°, 72.4°, 80°, or 90° is bonded to the first optical member 2 having the inclination angle θ2 of 35°. Referring to FIGS. 8 to 11, assume that the core refractive index $n_{24}$ and the cladding layer refractive index $n_{25}$ of the first optical member 2 are 1.56 and 1.52, respectively, and that the core refractive index $n_{34}$ and the cladding layer refractive index $n_{35}$ of the second optical member 3 are 1.82 and 1.495, respectively. In FIGS. 8 to 11, arrows in the core 24 indicate light which is incident on the boundary surface between the core 34 and the cladding layer 35 from the first optical member 2 at the critical angle, and arrows in the core 34 indicate this light that becomes incident on the core 34 upon refraction.

Figure 8:
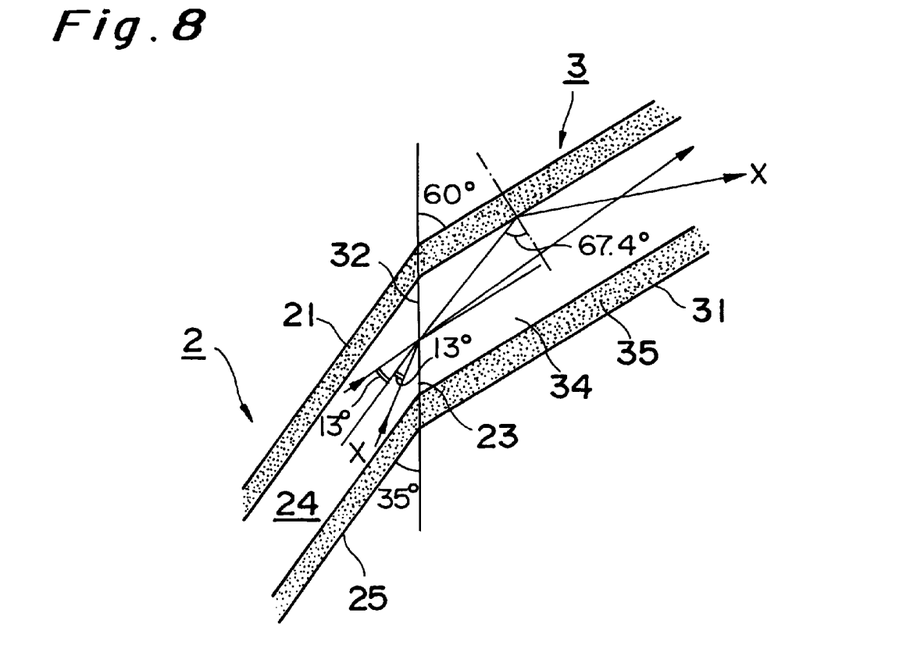
FIG. 8 is a view for explaining the inclination angle of the second optical member.
Figure 9:
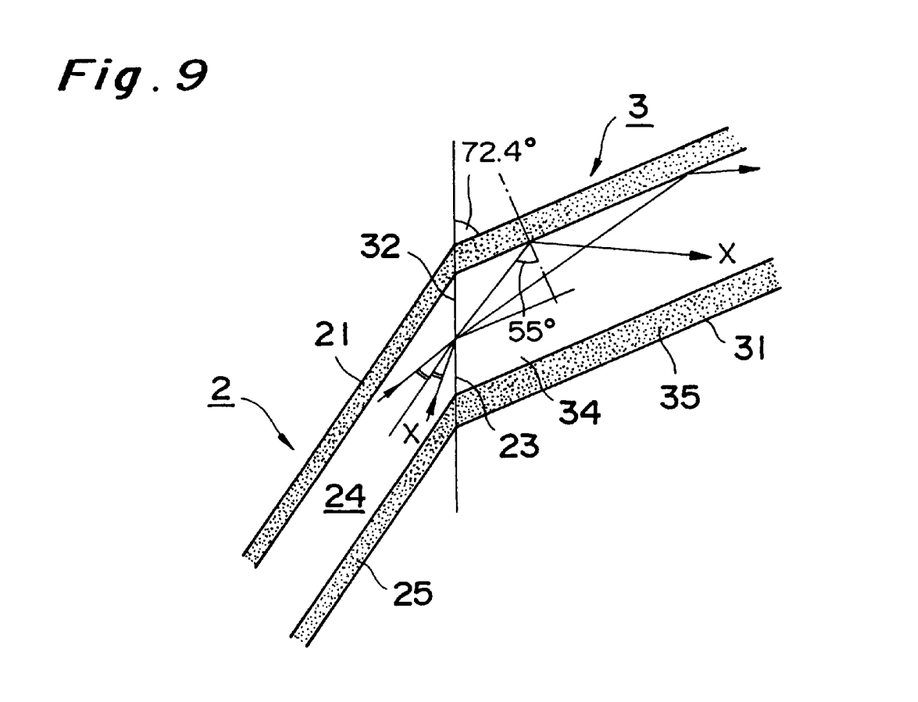
FIG. 9 is a view for explaining the inclination angle of the second optical member.
Figure 10:
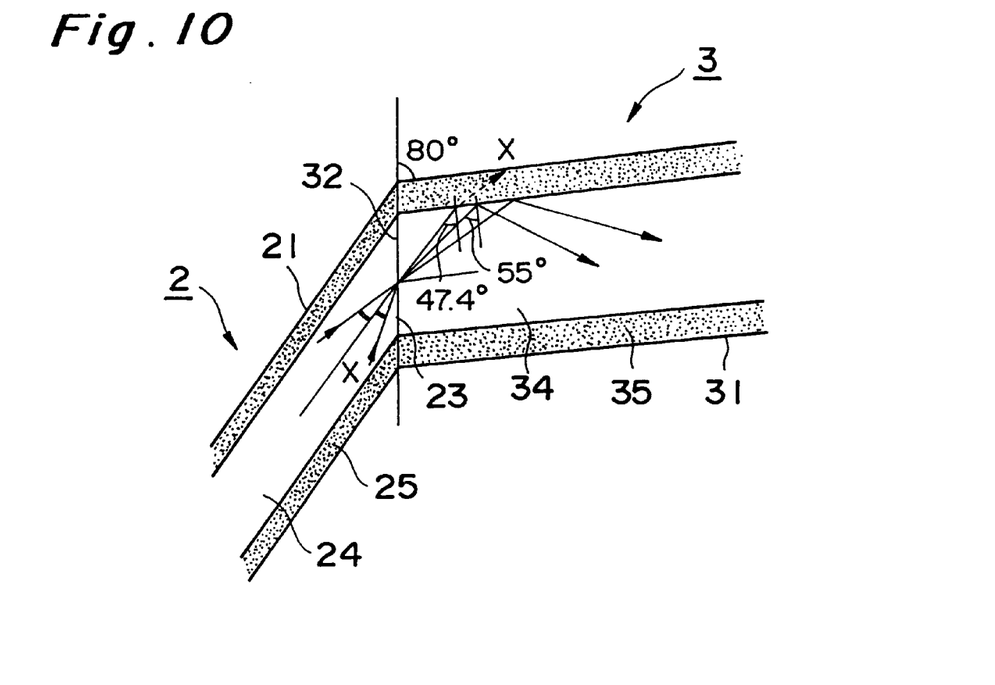
FIG. 10 is a view for explaining the inclination angle of the second optical member.
Figure 11:
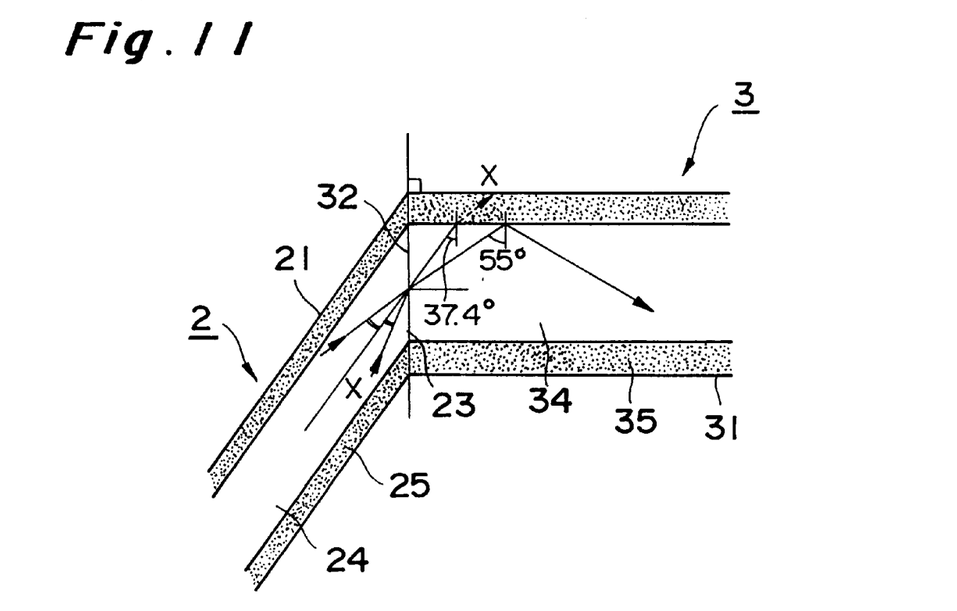
FIG. 11 is a view for explaining the inclination angle of the second optical member.

Referring to FIG. 8, when the second optical member 3 having the inclination angle θ3 of 60° is used, light X which is incident at the maximum incident angle from the first optical member 2 becomes incident on the boundary portion between the core 34 and the cladding layer 35 of the second optical member 3 at an angle larger than the critical angle of 55°, and is totally reflected by this boundary portion and propagates. Referring to FIG. 9, when the second optical member 3 having the inclination angle θ3 of 72.4° is used, light X1 which is incident at the maximum incident angle from the first optical member 2 becomes incident on the boundary portion between the core 34 and the cladding layer 35 of the second optical member 3 at the critical angle 55°, and is totally reflected by this boundary portion and propagates. Referring to FIG. 10, when the second optical member 3 having the inclination angle θ3 of 80° is used, light X1 which is incident at the maximum incident angle from the first optical member 2 becomes incident on the boundary portion between the core 34 and the cladding layer 35 of the second optical member 3 at an angle smaller than the critical angle 55°, i.e., at 47.4°, and is not totally reflected but is partly refracted by this boundary portion to leak into the cladding layer 35. In this case, of light becoming incident from the first optical member 2, light components that become incident on the boundary portion between the core 34 and the cladding layer 35 of the second optical member 3 at an angle smaller than the critical angle 55° leak into the cladding layer 35 and do not emerge from the surface 33 of the second optical member 3. Referring to FIG. 11, when the second optical member 3 having the inclination angle θ3 of 90° (right angle) is used, light X1 which is incident at the maximum incident angle from the first optical member 2 becomes incident on the boundary portion between the core 34 and the cladding layer 35 of the second optical member 3 at an angle smaller than the critical angle 55°, i.e., at 37.4°, and is not totally reflected but is partly refracted by this boundary portion to leak into the cladding layer 35. In this case, most of light incident from the first optical member 2 become incident on the boundary portion between the core 34 and the cladding layer 35 at an angle smaller than the critical angle of 55°, and only part of the light emerges from the surface 33 of the second optical member 3. In this manner, if the inclination angle θ3 of the second optical member 3 is excessively large, light incident from the first optical member 2 does not propagate in the second optical member 3 but leaks into the cladding layer 35 of the second optical member 3 and is absorbed by it. Therefore, to enable light that has become incident from the first optical member 2 to the second optical member 3 to entirely propagate effectively, light incident from the first optical member 2 must become incident on the cladding layer 35 in the core 34 of the second optical member 3 at an angle larger than the critical angle.

As described above, considering the condition for allowing emission of light from the surface 33 and the condition for allowing propagation of light in the second optical member 3, the inclination angle θ3 of the second optical member 3 is desirably set at such a value that allows light incident from the first optical member 2 to the second optical member 3 at the maximum angle to become incident on the boundary portion between the core 34 and the cladding layer 35 in the second optical member 3 at an angle close to the critical angle. When the inclination angle θ3 is set in this manner, light incident on the fiber optics device 1 emerges from the surface 33 effectively, and light containing a vertical component emerges from the surface 33, thereby improving the light-exit characteristics of the fiber optics device 1.

Referring to FIGS. 2 and 2A, the first optical member 2 and the second optical member 3 may be bonded to each other by adhesion using a transparent adhesive. As the adhesive, one having a refractive index between the refractive index of the cores 24 of the first optical member 2 and the refractive index of the core 34 of the second optical member 3 is preferably used. When an adhesive having such a refractive index is used, upon incidence of light from the first optical member 2 to the adhesive and upon incidence of light from this adhesive to the second optical member 3, the reflection quantity of light of the respective incident surfaces is suppressed.

How to use the fiber optics device 1 will be described.

Figure 12:
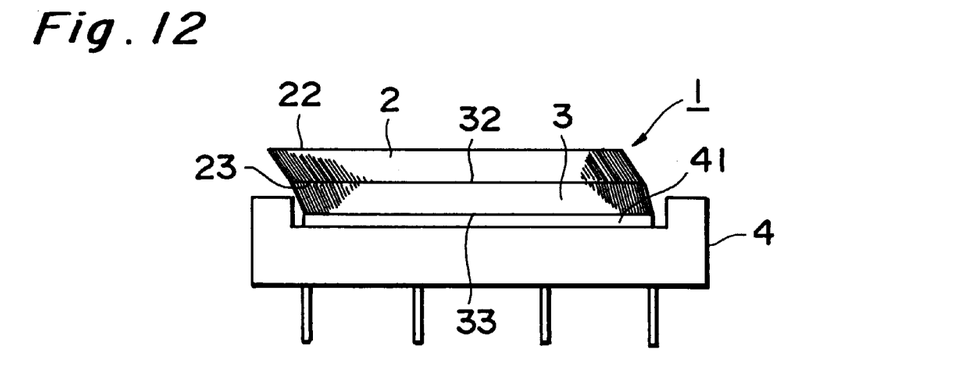
FIG. 12 is a view for explaining the fiber optics device in use.

As shown in FIG. 12, the fiber optics device 1 can be used as an means for inputting a fingerprint image to the fingerprint detecting apparatus. For example, the fiber optics device 1 is mounted on an image pickup element 4, e.g., a CCD, so that a fingerprint image can be received by the image pickup element 4 through the fiber optics device 1. More specifically, the surface 33 of the fiber optics device 1 is bonded to a light-receiving surface 41 of the image pickup element 4, so that the fingerprint image of a finger which comes in contact with the surface 22 can be transmitted to the light-receiving surface 41 through the first optical member 2 and the second optical member 3.

In the fingerprint detecting apparatus having this structure, when a finger comes into contact with the surface 22, light becomes incident on the first optical member 2 from only this contact portion. The image of this light forms a three-dimensional fingerprint image and propagates in the optical fibers 21 of the first optical member 2. The image then emerges from the surface 23 of the first optical member 2 to become incident on the surface 32 of the second optical member 3.

The optical image reaches the surface 33 of the second optical member 3 and becomes incident on the light-receiving surface 41 of the image pickup element 4 from the surface 33. At this time, the light components constituting the fingerprint image respectively emerge in a wide range from the surface 33 in accordance with the large numerical aperture of the second optical member 3. Therefore, the quantity of light components that become vertically incident on the light-receiving surface 41 is ensured, so that the fingerprint image becomes clear. Accordingly, a clear fingerprint image is input to the image pickup element 4, thereby performing high-precision fingerprint detection. The fiber optics device 1 is used in not only the fingerprint detecting apparatus, but can also be used in any other apparatus that requires optical incidence.

(Second Embodiment)

The fiber optics device of the embodiment 2 is obtained by setting the inclination angle θ1 of the second optical member 3 of the fiber optics device 1 described above to such a value that light which is incident on the second optical member 3 from the first optical member 2 at the maximum incident angle becomes incident on the boundary portion between the core 34 and the cladding layer 35 in the second optical member 3 at an angle larger than the critical angle. For example, an inclination angle θ2 of the first optical member 2 and the inclination angle θ3 of the second optical member 3 are set equal to each other. In this case, as far as the numerical aperture of the second optical member 3 is larger than that of the first optical member 2, the exit characteristics of light from the second optical member 3 can be improved.

(Third Embodiment)

Figure 13:
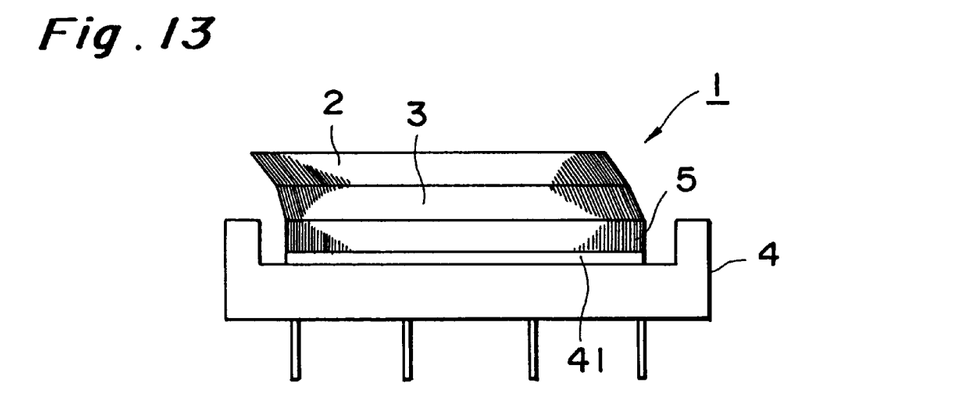
FIG. 13 is a view for explaining a fiber optics device according to the third embodiment in use.
Figure 14:
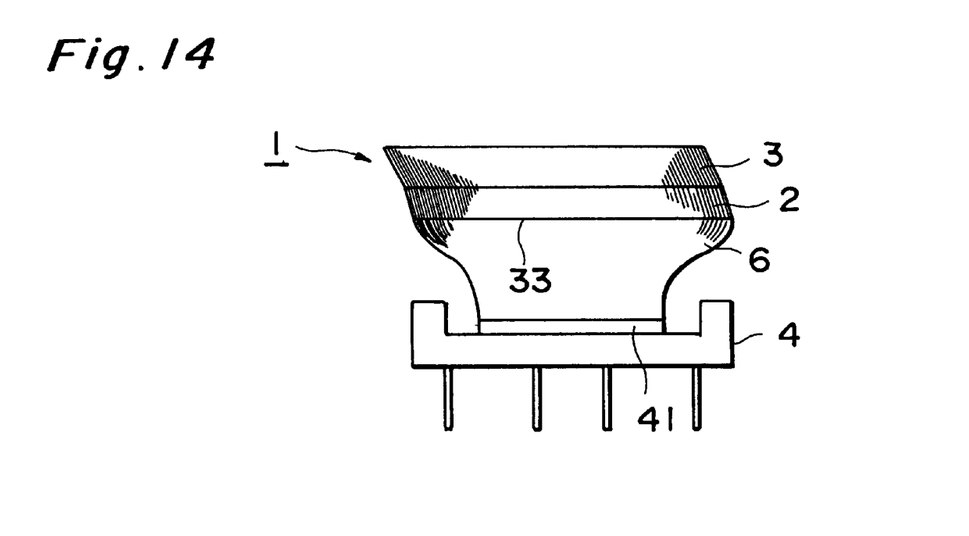
FIG. 14 is a view for explaining the fiber optics device according to the third embodiment in use.

The fiber optics device of the third embodiment is obtained by interposing, between the light-receiving surface 41 of the image pickup element 4 and the fiber optics device 1 described above, other fiber optics optical member assemblies for improving the optical coupling characteristics when using the fiber optics device 1. For example, as shown in FIG. 13, a fiber optics device 5 whose incident and exit surfaces are formed to intersect the optical axis of the optical fibers perpendicularly may be interposed between a fiber optics device 1 and a light-receiving surface 41, thereby improving the optical coupling characteristics between the fiber optics device 1 and the image pickup element 4. As shown in FIG. 14, if a fiber optics device 6 whose incident surface is smaller than the exit surface is interposed between a fiber optics device 1 and a light-receiving surface 41, even if a surface 33 of the fiber optics device 1 and a light-receiving surface 41 have different areas, an optical image can be transmitted without a loss.

As has been described above, according to the present invention, the following effects can be obtained.

When the numerical aperture of the second optical member is set larger than that of the first optical member, light can become incident on the second optical member from the first optical member easily, and light can emerge from the exit surface of the second optical member in a wide range.

If the refractive index of the cores of the optical fibers of the first optical member is set to be equal to or higher than the refractive index of the cores of the optical fibers of the second optical member, when light propagates from the first optical member to the second optical member, it becomes incident on the second optical member without being totally reflected by the bonding portion between the first and second optical members. Therefore, an optical loss occurring at the bonding portion is prevented, and a clear optical image emerges from the exit surface.

Furthermore, when the inclination angle of the second optical member is set such that light incident on the second optical member from the first optical member at the maximum incident angle becomes incident on the boundary surface between the core and the cladding layer of the second optical member at a critical angle, light which is incident on the second optical member from the first optical member reliably propagates along the second optical member.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 100158/1996 filed on Apr. 22, 1996 is hereby incorporated by reference.

What is claimed is:

1. A fiber optics device comprising:
   a first optical member obtained by integrating a plurality of optical fibers of a first type by bundling and having first and second end faces, the first end face obliquely intersecting an image transmitting direction at a first angle, the second end face being substantially parallel to the first end face thereof, and the optical fibers of the first type having a first numerical aperture and cores with a first refractive index; and
   a second optical member obtained by integrating a plurality of optical fibers of a second type by bundling and having first and second end faces, the first end face obliquely intersecting the image transmitting direction at a second angle different from the first angle, the second end face being substantially parallel to the first end face thereof, the optical fibers of the second type having a second numerical aperture larger than the first numerical aperture and cores with a second refractive index, and the first end face of the second optical member being bonded to the second end face of the first optical member.

2. A fiber optics device according to claim 1, wherein the first angle is set smaller than the second angle.

3. A fiber optics device according to claim 1, wherein the first refractive index is substatially equal to or less than the second refractive index.

4. A fiber optics device according to claim 1, wherein light propagating through the first optical member and become incident on the first end face of the second optical member, light components having the maximum incident angle become incident on the boundary surface between the core and the cladding layer of the optical fibers of the second type at an incident angle equal to or larger than the critical angle.

5. An image pickup device, comprising:
   a first optical member obtained by integrating a plurality of optical fibers of a first type by bundling and having first and second end faces, the first end face obliquely intersecting an image transmitting direction at a first angle, the second end face being substantially parallel to the first end face thereof, and the optical fibers of the first type having a first numerical aperture and cores with a first refractive index;

a second optical member obtained by integrating a plurality of optical fibers of a second type by bundling and having first and second end faces, the first end face obliquely intersecting the image transmitting direction at a second angle different from the first angle, the second end face being substantially parallel to the first end face thereof, the optical fibers of the second type having a second numerical aperture larger than the first numerical aperture and cores with a second refractive index, and the first end face of the second optical member being bonded to the second end face of the first optical member; and an image pickup element located on said fiber optics plate for receiving an image transmitted from said fiber optics plate.

* * * * *